(No Model.) 11 Sheets—Sheet 3.
C. W. THOMAS.
DYNAMO ELECTRIC MACHINE.
No. 478,529. Patented July 5, 1892.
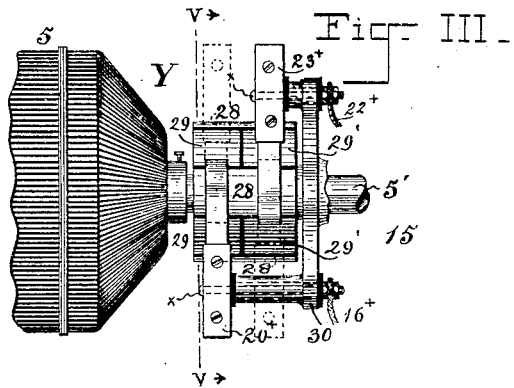
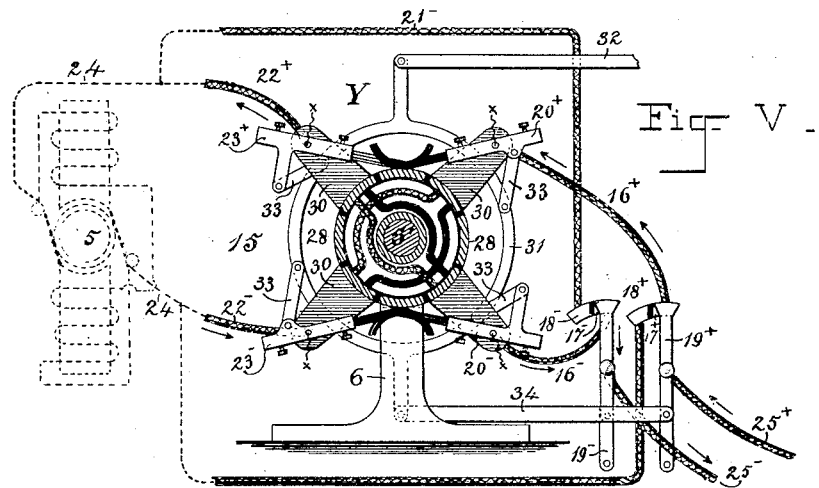
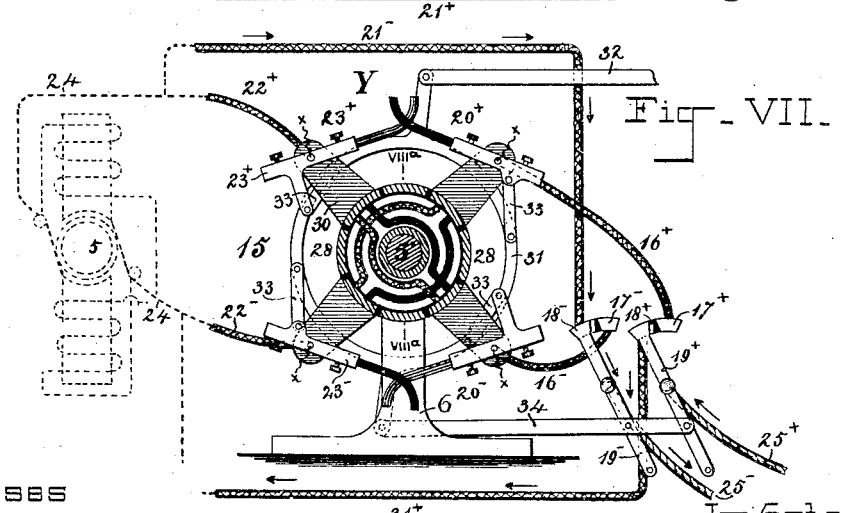
Witnesses
John F. Nelson
Lillie Hanna
Inventor
Chas. W. Thomas
By Knight Bros.
Att'ys.

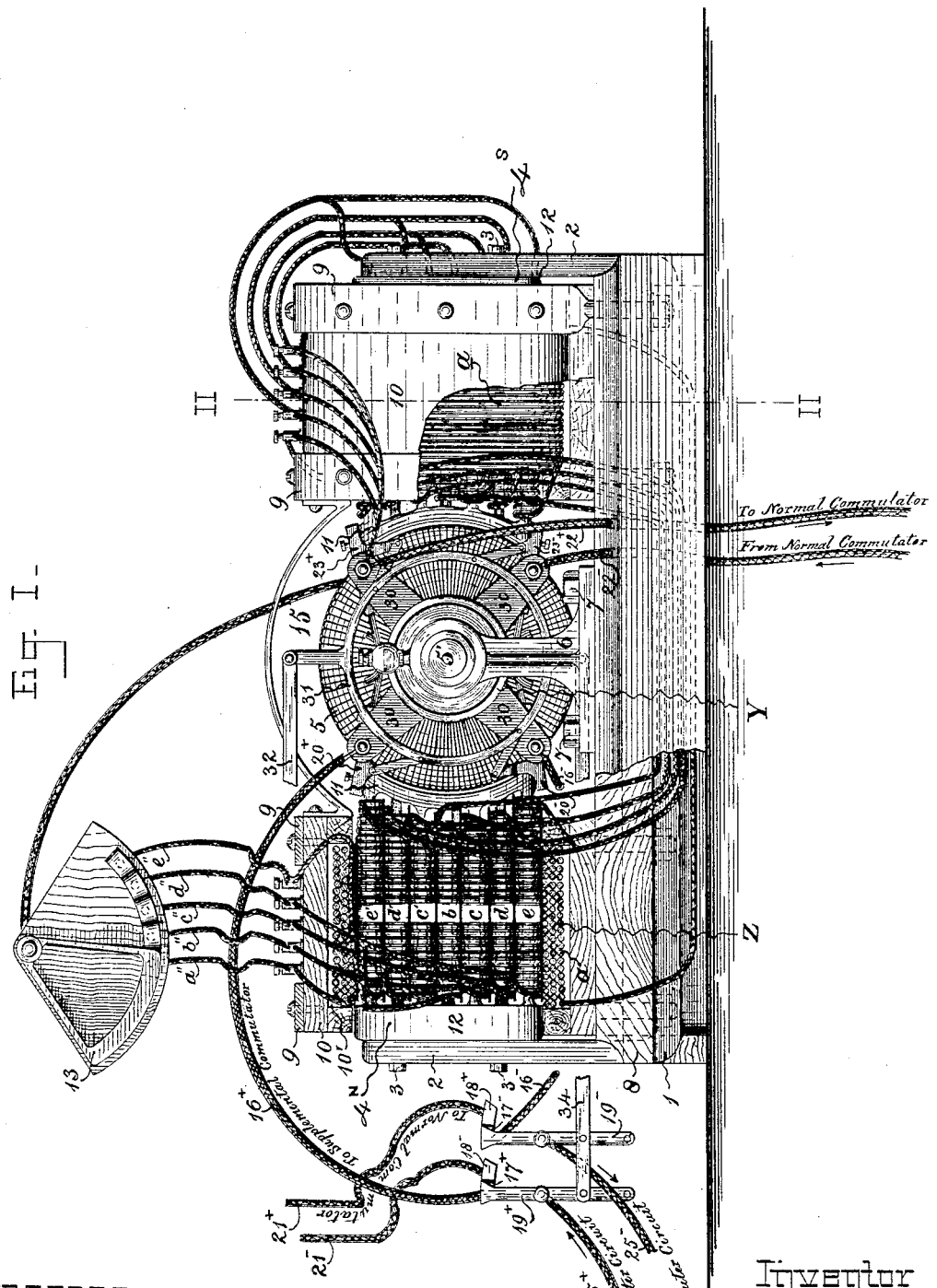

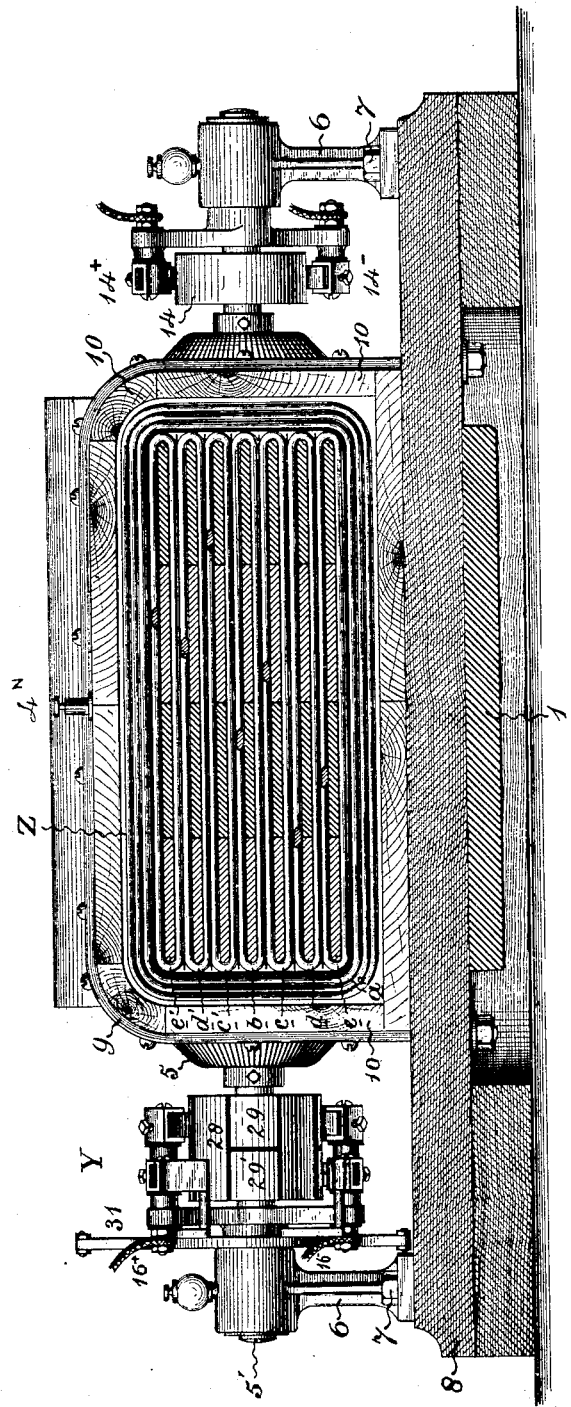

(No Model.)
11 Sheets—Sheet 4.
C. W. THOMAS.
DYNAMO ELECTRIC MACHINE.
No. 478,529. Patented July 5, 1892.
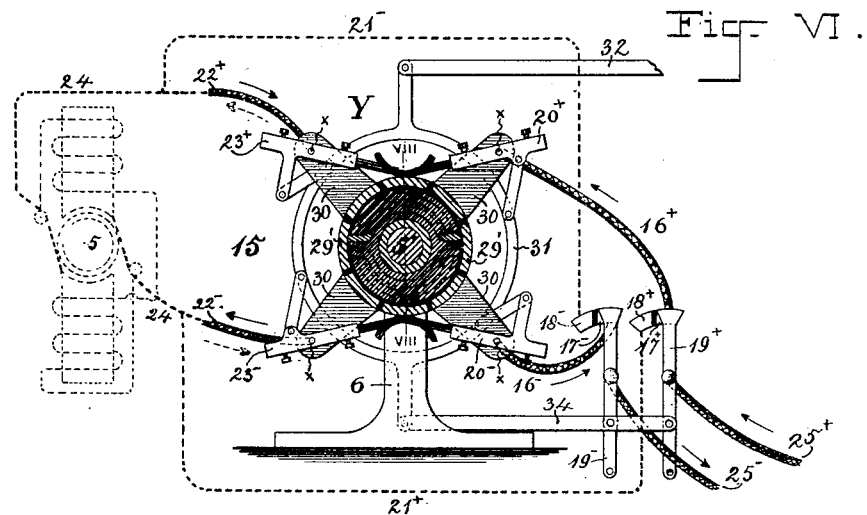
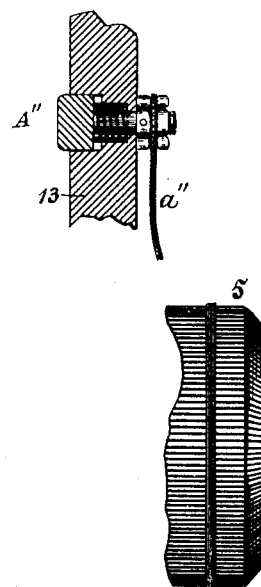
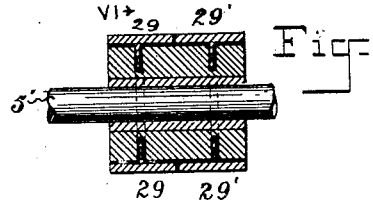
Witnesses
John F. Nelson
Lillie Hanna
Inventor
Chas. W. Thomas
By Knight Bros.
Att'ys.

(No Model.) 11 Sheets—Sheet 5.
C. W. THOMAS.
DYNAMO ELECTRIC MACHINE.
No. 478,529. Patented July 5, 1892.
Fig. IX.
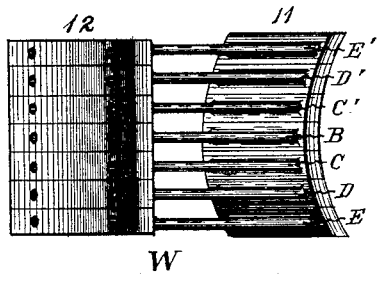
Fig. X.
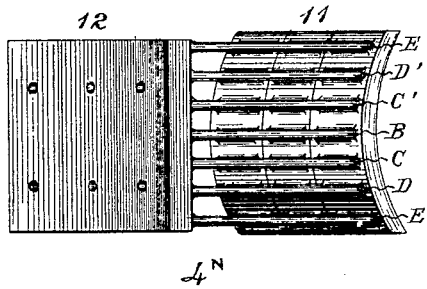
Fig. XV.
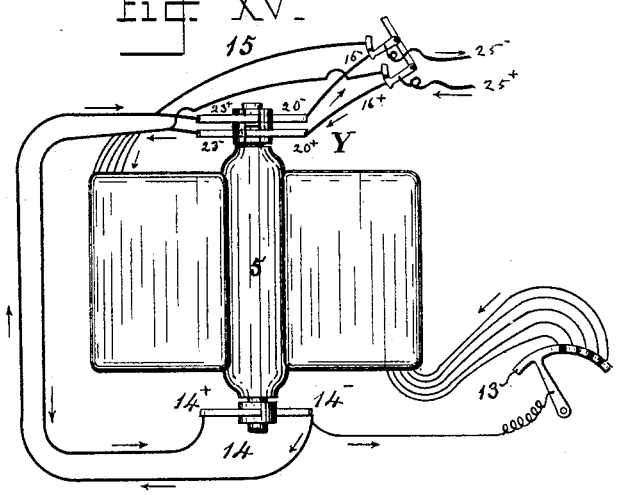
Fig. XVI.
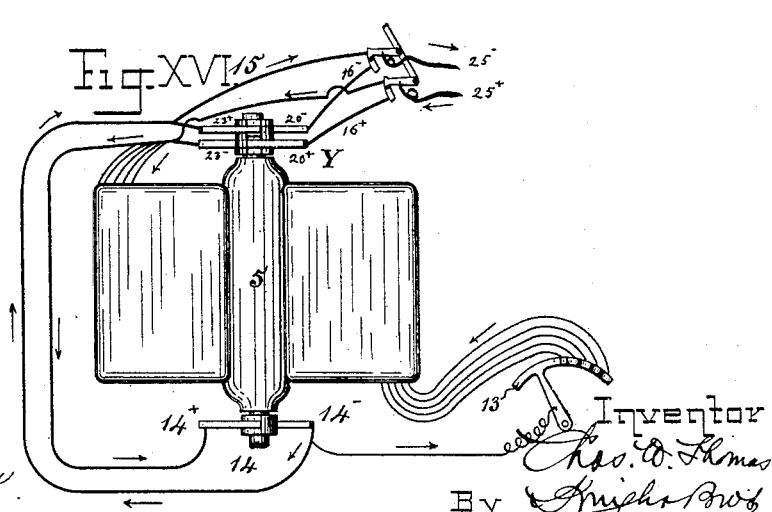

(No Model.) 11 Sheets—Sheet 6.
C. W. THOMAS.
DYNAMO ELECTRIC MACHINE.
No. 478,529. Patented July 5, 1892.
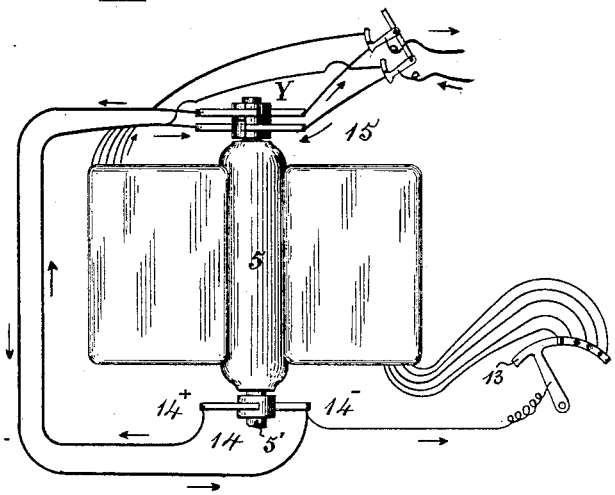
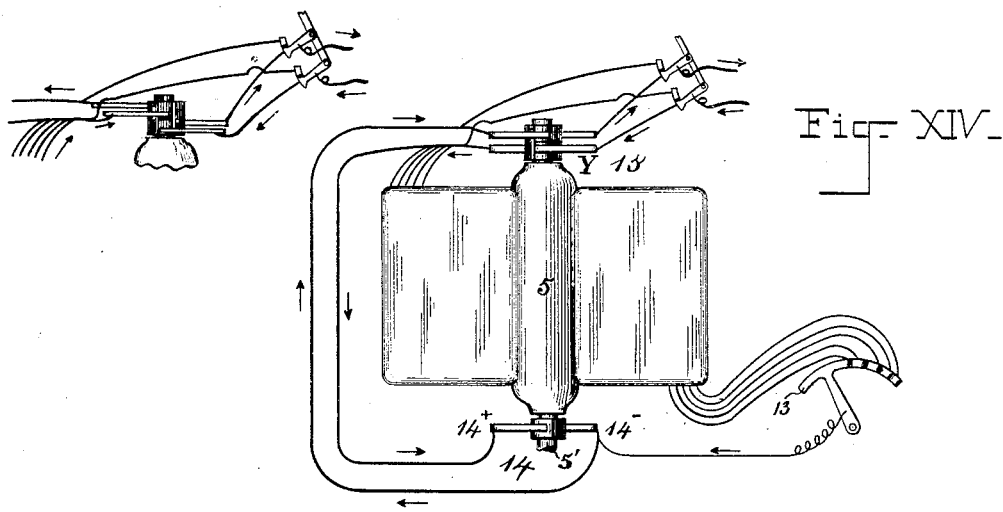
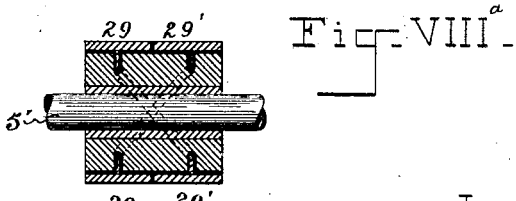

(No Model.) 11 Sheets—Sheet 7.
C. W. THOMAS.
DYNAMO ELECTRIC MACHINE.
No. 478,529. Patented July 5, 1892.
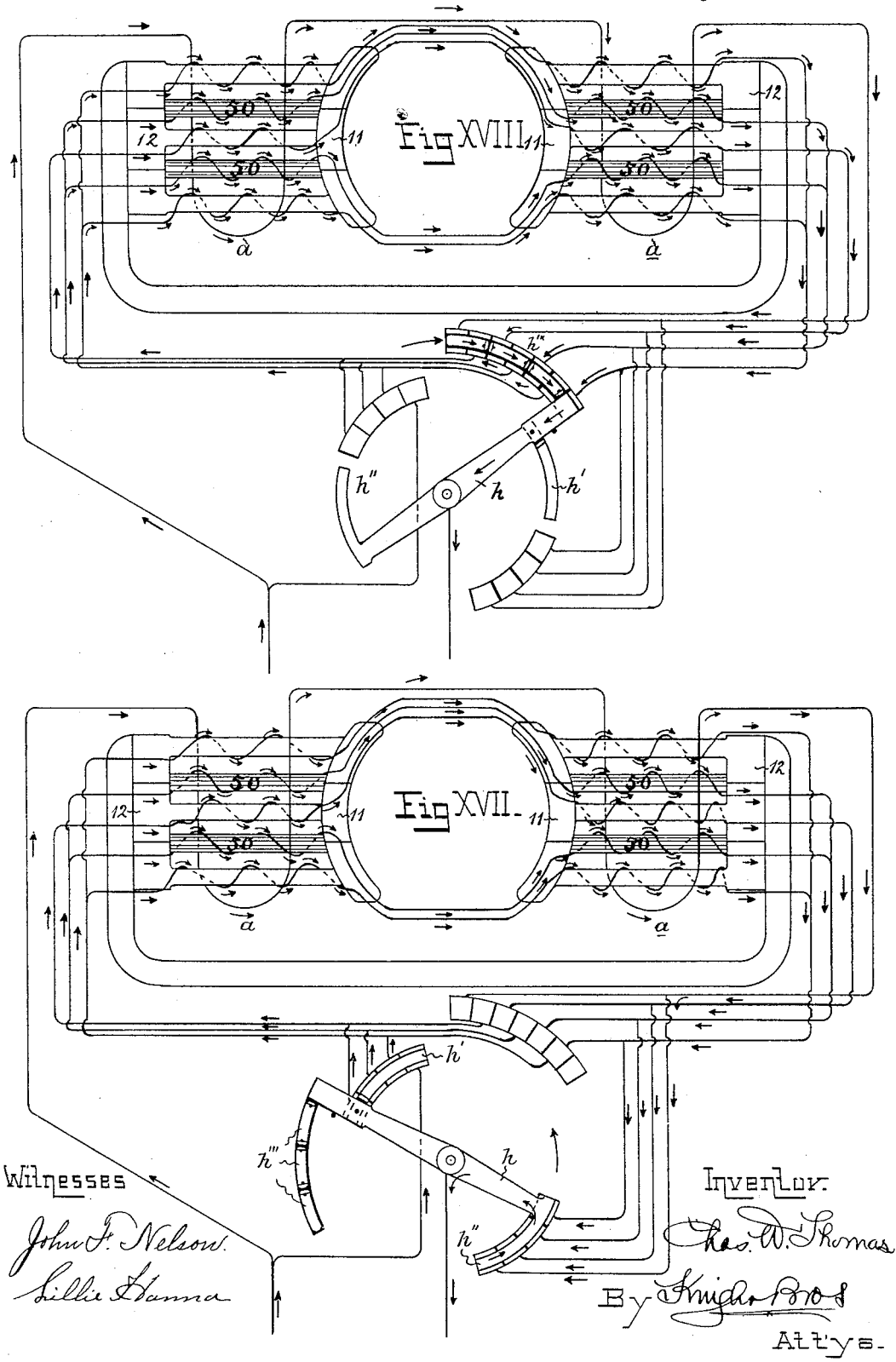

(No Model.) 11 Sheets—Sheet 8.
C. W. THOMAS.
DYNAMO ELECTRIC MACHINE.
No. 478,529. Patented July 5, 1892.
Fig. XIX.
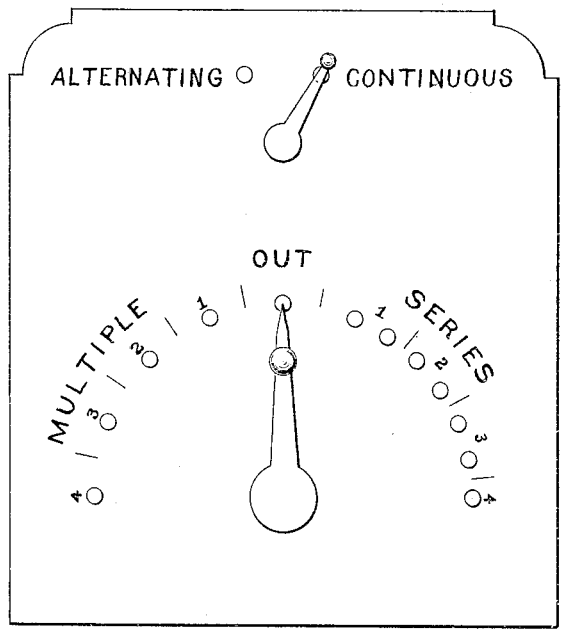
Fig. XX.
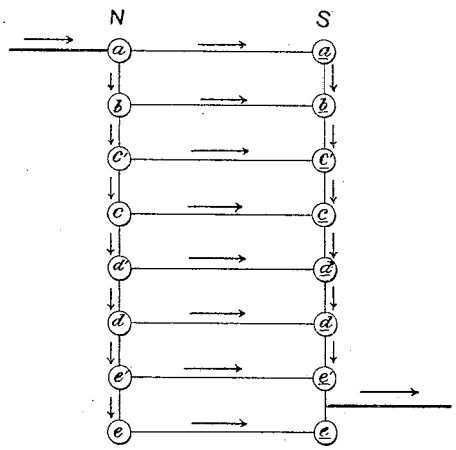
Fig. XXI.
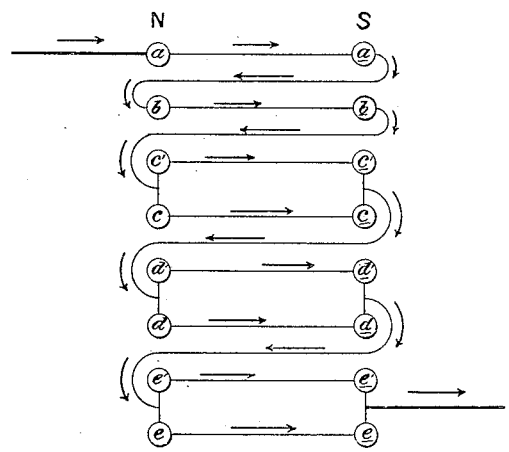
Witnesses.
John F. Nelson,
Lillie Hanna.
Inventor.
Chas. W. Thomas
By Knight Bros
Att'ys.

(No Model.) 11 Sheets—Sheet 9.
C. W. THOMAS.
DYNAMO ELECTRIC MACHINE.
No. 478,529. Patented July 5, 1892.
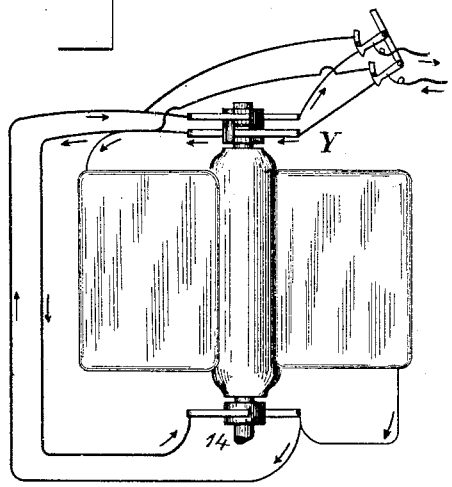
Fig. XXIV.
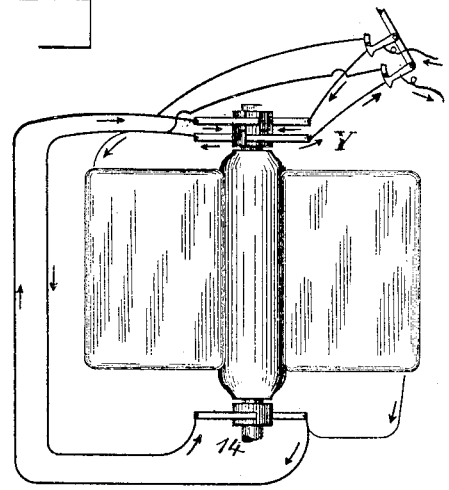
Fig. XXIII.
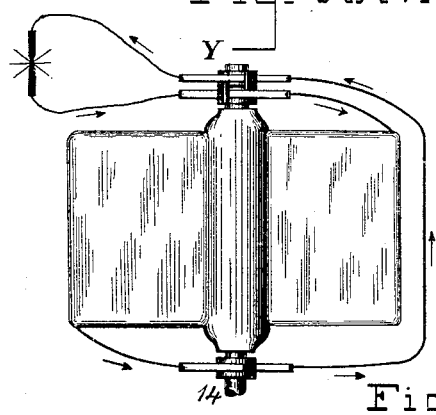
Fig. XXV.
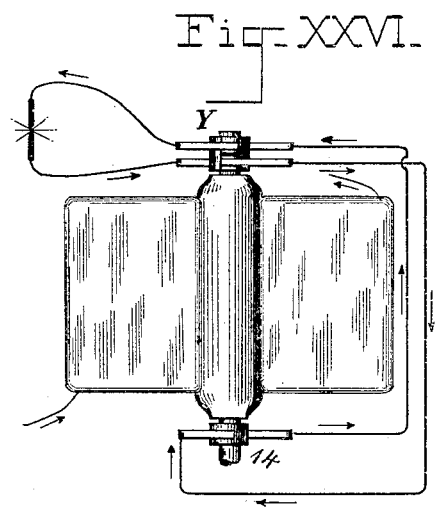
Fig. XXVI.
Fig. XI.ᵃ
Witnesses
John P. Nelson
Lillie Hanna
Inventor
Chas. W. Thomas
By Knight Bros
Attys.

(No Model.) 11 Sheets—Sheet 10.
C. W. THOMAS.
DYNAMO ELECTRIC MACHINE.
No. 478,529. Patented July 5, 1892.
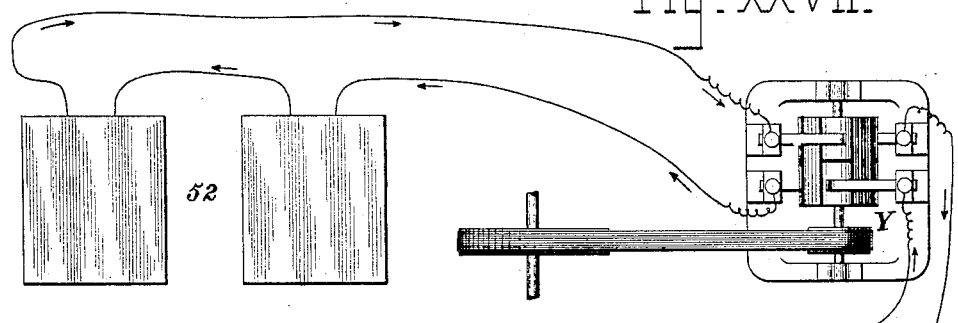
Fig. XXVII.
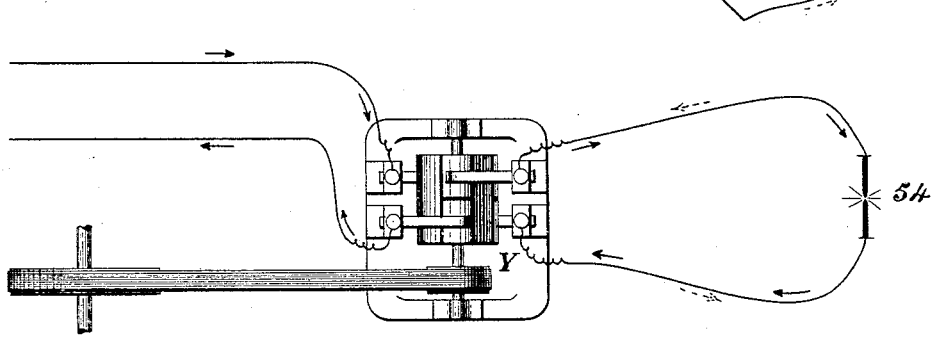
Fig. XXVIII.
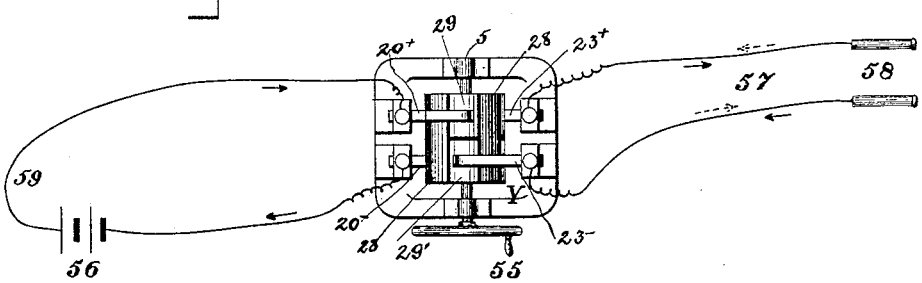
Fig. XXIX
Witnesses.
John F. Nelson
Lillie Hanna
Inventor.
Chas. W. Thomas
By Knight Bros
Att'ys.

(No Model.)
11 Sheets—Sheet 11.
C. W. THOMAS.
DYNAMO ELECTRIC MACHINE.
No. 478,529.   Patented July 5, 1892.
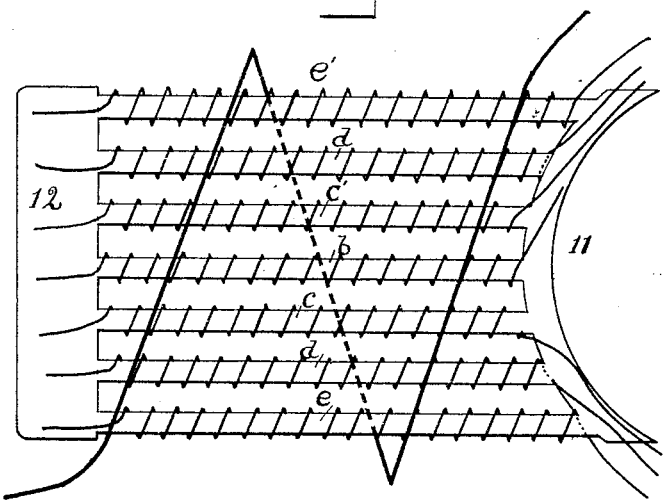
Fig. XXX.
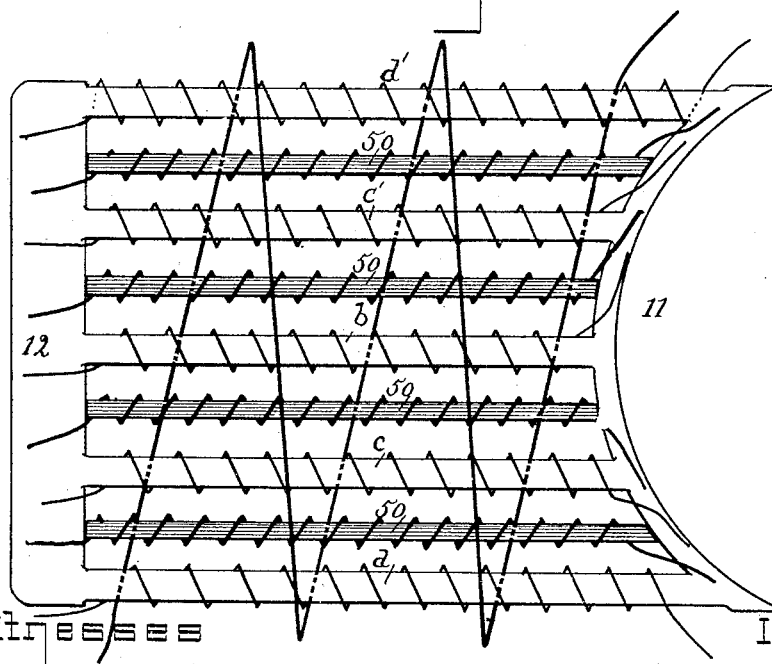
Fig. XXXI.
Witnesses
Lillie Hanna
Frank Guile
Inventor
Chas. W. Thomas
By Hughes Bros.
Att'ys.

UNITED STATES PATENT OFFICE.

CHARLES W. THOMAS, OF JERSEY CITY, NEW JERSEY, ASSIGNOR OF PART TO PHILIP VAN VOLKENBURGH, OF NEW YORK, AND JOHN H. PENDLETON, OF BROOKLYN, NEW YORK.

DYNAMO-ELECTRIC MACHINE.

SPECIFICATION forming part of Letters Patent No. 478,529, dated July 5, 1892.

Application filed October 21, 1890. Serial No. 368,853. (No model.)

*To all whom it may concern:*

Be it known that I, CHARLES W. THOMAS, a citizen of the United States, residing at Jersey City, county of Hudson, State of New Jersey, have invented certain new and useful Improvements in Dynamo-Electric Machines, of which the following is a specification.

In this specification the phrase-word "dynamo-electric machine" is used in its generic sense—that is to say, to include generators and motors.

The name "coreless bobbin" where used in this specification means a bobbin whose spool or central portion that supports the winding is of non-magnetic material.

My invention is more especially intended for those electric motors in which the field-magnet and armature are in shunt of each other and which are driven by a continuous ("one-way") dynamo-current. Associated with these members I provide a supplementary commutator or alternator of peculiar construction, and, together therewith, suitable switches, which enable the person to change this one-way dynamo-current into an alternating current in both armature and field-magnet, whose rapidity of reversals depends on the number of longitudinal divisions of such supplementary commutator. In other words, the operator can at any instant produce in the motor either a one-way or an alternating current by means wholly independent of the armature-winding.

Another leading part of my invention consists of a construction of the motor-field and suitable associated switch mechanism which enable the operator to bring a less or greater portion of the field-magnet into activity and with any desired relative electric pressure and current volume.

My improvements comprise, first, a commutator of a peculiar duplex construction, which being associated in a supplemental or auxiliary capacity with the ordinary commutator and with suitable switch mechanism enables the operator to pass a one-way dynamo-current into the motor either in a continuous or in an alternating form at will; second, a grid-formed field-magnet core with multiplex winding; third, means for varying the absolute field-magnet force by cutting such windings into or out of circuit; fourth, means for varying the relative electric pressure and current volume by coupling said windings either in series or in multiple; fifth, the provision in such grid-formed field-magnet core of intermediate differentially-wound coreless bobbins, which operate both to magnetically insulate the adjacent winding of and to intensify the electro-magnetic force of the bobbins proper; sixth, a construction of such grid-formed field-magnet core in separate sections or laminæ in planes parallel to the magnetic axis and the axis of armature rotation; seventh, an adaptation of my duplex commutator to medical purposes.

In the form which I have selected to illustrate my improvements the cores and core connections of the cored bobbins are understood to be of pure charcoal-iron.

The spools which support the windings of my coreless bobbins may be of brass or other suitable non-magnetic material.

Insulation is applied between all parts which, while mechanically connected, require to be either electrically or magnetically insulated.

The circuits spoken of in this specification are "metallic" circuits—that is to say, consist of complete outgoing and of returning (not grounded) wires to and from the current source.

In the accompanying drawings, which form a part of the specification, Figure I is a partly-sectional elevation of the end of the machine which carries my duplex (supplemental) commutator. Fig. II is a section on the line II II, Fig. I. Fig. III is a top view of the supplemental commutator at that instant of its rotation in which it is transmitting current in its unchanged—that is to say, direct—form. Fig. IV is a like view at that stage of rotation in which a reverse current is being transmitted. Fig. V is a section on the line V V, Fig. III, the field-magnet and the armature being shown diagrammatically by dotted lines. Fig. VI is a section on the line VI VI, Fig. IV. Fig. VII is a cross-section of the supplementary commutator in the same diametric plane as in Fig. V, but representing the supplementary commutator cut out of circuit by the lifting of the four brushes, and by the same switch movement the normal commutator brought directly into circuit, so as to transmit the dynamo-current in continuous (unchanged) form to the motor. Fig. VIII is an axial section of the supplemental commutator on the line VIII VIII, Fig. VI. Fig. VIII$^a$ is a like section on the line VIII$^a$ VIII$^a$, Fig. VII. Fig. IX represents my grid-shaped field-magnet core in its preferred form. Fig. X shows a modification of my grid-shaped field-magnet core. Fix. XI represents a switchboard adapted for placing a less or greater number of the field-magnet windings in multiple connection. Fig. XI$^a$ represents a switchboard adapted for placing a less or greater number of field-magnet windings in series. Fig. XII is a section on the line XII XII, Fig. XI. Figs. XIII and XIV are diagrams which represent the switch mechanism set for alternate current, and so as to bring only a part of the field-windings into service, Fig. XIII showing the commutator at a point of rotation in which a direct, and Fig. XIV at a point in which a reverse, current is being transmitted. Fig. XV is a diagram which represents the switch mechanism set for sending an alternating current into motor. Fig. XVI shows the same mechanism set for transmitting a continuous current. Fig. XVII and XVIII are diagrams which illustrate several modifications—namely, a form of my grid-shaped field-magnet core in which oppositely-wound coreless bobbins are interposed between the bobbins proper and in which both multiple and series switches are attached to a single rotatable handle—Fig. XVII showing the mechanism set for multiple and Fig. XVIII for series connection, and both figures showing the switch at a position that brings all the field-magnet windings into circuit Fig. XIX represents a switchboard arrangement for operating the switch mechanisms represented in Figs. V, VI, VII, XVII, and XVIII. Figs. XX and XXI are graphic expressions of the bobbin connection shown in Figs. XVII and XVIII, respectively. Fig. XXII is a diagram which represents my supplemental commutator so modified as to pair each short segment with its antipode in the other plane. Figs. XXIII to XXVI, inclusive, represent an application of my duplex commutator to a dynamo by which a continuous current from the dynamo is transmitted in the form of an alternating current into line, thus: Fig. XXIII is a diagram which represents an arrangement of field-magnet wire connections for a shunt-wound form of dynamo, the commutator being shown at that point of rotation in which the current-pulsation is direct. Fig. XXIV represents the same mechanism at the reverse pulsation. Fig. XXV is a diagram which represents an arrangement of field-magnet wire connections for a series-wound form of dynamo for sending an alternating current to line. Fig. XXVI represents an arrangement of field-magnet wire connections for a separately-excited form of dynamo for sending an alternating current into line. Fig. XXVII is a diagram which shows a utilization of such duplex commutator for converting a one-way current from a storage-battery or other source of current into an alternating current in a motor. Fig. XXVIII shows a utilization of such commutator by which a one-way current from the line-wire is converted into an alternating current in a wire employed for electric lighting or other service. Fig. XXIX represents a utilization of such commutator by means of which a direct current from a galvanic battery is convertible at will into an alternating current for electro-therapeutic, educational, or other purposes. Fig. XXX is a diagrammatic representation of my multiplex field-magnet having windings of diverse grades of wire at different parts. Fig. XXXI is a like diagram which shows a diversely-wound arrangement of that form of my field-magnet which has interposed coreless bobbins.

A horizontal portion or base 1 and uprights 2, formed integral with said base, constitute a massive iron "horseshoe," which magnetically connects and constitutes the supporting-frame of the field-magnet cores $4^N$ $4^S$. These field-cores are of the represented multiplex or "grid" form (see W, Fig. IX) and are secured to the inner faces of the uprights 2 by means of bolts 3. My said field-magnet cores have the customary concave faces next the armature 5. The armature-shaft 5' is journaled in pedestals 6, which are secured by bolts 7 to a plank or bed-piece 8, which is itself firmly bolted to the base 1. Secured to the bed-piece 8 by straps 9 are wooden shells 10, whose annular troughs 10' inclose the respective field-magnets Z, which, being of identical construction one with the other, description of one will apply to both. Each field-magnet core has the represented multiplex or grid form—that is to say, it comprises a series of plates, bars, or cores proper B, C, C', D, D', E, and E' in planes parallel to the magnetic axis and the axis of armature rotation, united integrally at their inner ends to the curved (concavo-convex) pole-plates 11 and at their other ends to heads 12, which receive the bolts 3, already spoken of, by which said field-magnet core is connected to the frame.

Each grid-form field-magnet core may consist of a single forging, but is preferably constructed as shown in Fig. IX, in which each core proper, with the contiguous portion of pole-piece and head, consists of a separate I-formed slab or plate. The cores proper are separately but similarly wound, so as to constitute electro-magnetic bobbins (distinguished in this specification as the interior bobbins)—namely, a bobbin $b$ on the core B and bobbins connected in pairs $c$ $c'$, $d$ $d'$, and $e$ $e'$ on the cores C C', D D', and E E', respectively.

Switching mechanism, to be presently explained, enables the interior bobbins to be placed severally or collectively either in or out of circuit and, when in circuit, so as to connect either serially or in multiple at will of the operator. The group of interior bobbins is encircled in a general bobbin or winding $a$, which is permanently in circuit. The corresponding bobbins of the other field-magnet pole are indicated by like letters, thus: $a$, $b$, $c$, $c'$, $d$, $d'$, $e$, and $e'$. The connections are such (see Figs. XVII and XVIII) that each bobbin is in permanent series with the corresponding bobbin of the other field-magnet pole and that the interior bobbins when an even or all but the central one when there is an odd number of them are permanently coupled in multiple pairs. Consequently each pair with relation to the different modes of optional coupling may be spoken of as a "unit." Hence when joined as in Fig. XVII all the bobbins of either field-magnet pole are connected in multiple, (see Diagram XX,) and when joined as in Fig. XVIII all the bobbins (with the exception of the permanent pairing, as stated) are united in series. (See Diagram XXI.)

The switch mechanism for multiple and series coupling, although similar, may be entirely independent of one another, as shown in Figs. XI and XI$^a$, but are preferably arranged on a single holder, as in Figs. XVII and XVIII.

The switch mechanism for multiple coupling as shown in Fig. XI will now be explained. 13 is a pivoted switch having an arcuate contact-piece $h'$, which by a less or greater shift of the switch in direction of strong arrow brings in circuit any desired number of the spring contact-plates A'', B'', C'', D'', and E'', to which are severally secured the wires $a''$, $b''$, $c''$, $d''$, and $e''$, which respectively connect with the general bobbin $a$, the central bobbin $b$, and the several bobbin pairs $c\ c'$, $d\ d'$, and $e\ e'$ of my multiplex pole-piece.

Figs. XI, XIII, XIV, XV, and XVI show the switch so placed as to bring only the outer windings $a\ a$ in circuit. Shift of the switch from this primary position the distance of one contact-plate operates to slightly intensify the field magnetism by including, also, in circuit the central bobbins $b\ b'$. Further shifts add in succession the several bobbin pairs, with corresponding increase of field magnetism. My preferred arrangement for this service is seen at Fig. XVII, which shows two sets of spring-contacts for the ingoing and outgoing currents, respectively, of a metallic circuit and two arcuate contact-pieces $h'\ h''$, that both project rigidly and one piece $h''$ integrally from a rotatable holder $h$. The contact-piece $h'$ is insulated from the holder to prevent short-circuiting across the holder.

For series switching the number of spring contact-plates is increased to two for each bobbin, with one additional one for the return-wire of the outermost winding, and there are several rigidly-connected but electrically-insulated shiftable contact-pieces $h'''$, whose number is one in excess of the interior bobbins. (See Figs. XI$^a$ and XVIII.)

14$^+$ 14$^-$ may represent the brushes and 14 the ordinary segmental cylinder of a customary commutator of construction appropriate to the special type of motor employed.

In addition to and capable of being at the operator's discretion interposed between the dynamo-circuit and the customary commutator is another one called by me the "duplex" or "supplementary" commutator Y, which when brought into circuit transmits the one-way dynamo-current in alternating form to the customary commutator, and thence to the field and armature windings. My said duplex commutator is like these instrumentalities generally in that it is composed of longitudinal staves or segments symmetrically disposed about and revolving with but insulated from the armature-shaft and from each other, but differs from the customary form in that each long segment 28 is separated from the like segment on each side of it by two short or half-length segments 29 29' in separate planes of rotation. There being an even number of long segments, (and necessarily also of pairs of short ones,) each long segment has a like long segment and each pair of short segments a like pair opposed to it on the diametrically-opposite side of the commutator. Normally impinging on but capable of being lifted from the supplementary commutator are two pairs of collectors or brushes 20$^+$ 20$^-$ 23$^+$ 23$^-$, of which one pair is in the plane of rotation of the short segments 29 and the other pair is in the plane of rotation of the short segments 29'.

Inasmuch as the current changes during each armature rotation exactly equal the aggregate number of longitudinal divisions, the present expedient enables the constructor of the machine to secure any desired rapidity of current changes in the motor without reference to the special type of motor-winding by providing a sufficient number of such divisions.

16$^+$ 16$^-$ are wires that connect contact-plates 17$^+$ 17$^-$ of switches 19$^+$ 19$^-$ with the pair of alternate-current brushes 20$^+$ 20$^-$ of the dynamo-circuit 25$^+$ 25$^-$. 21$^+$ 21$^-$ are wires that connect contact-plates 18$^+$ 18$^-$ of said switches with the wires 22$^+$ 22$^-$, which conduct to the remaining pair of alternate-current brushes 23$^+$ 23$^-$ of the motor-circuit 24. Each long segment 28 is insulated from every other; but each short segment communicates with a like antipodal segment—that is to say, each segment 29 or 29' connects with the diametrically-opposed segment 29' or 29. The arrangement by which the short segments are connected may be such as to connect the diametrically-opposed short segment of the same plane, or it may be such as to connect the short segment of the other plane. The first-named of these arrangements is illustrated in Figs. II, IV, VI, VIII, XIV, XV, XXIV, XXV, XXVI, XXVII, XXVIII, and XXIX. The second named is illustrated in Figs. I, VIII<sup>a</sup>, and XX. Each alternating-current transmitting brush is pivoted at x to a rocking spider 30, which is pivoted to the pedestal 6 or other part of the frame.

The two pairs of brushes $20^+ 20^+ 23^+ 23^-$ of the alternate-current commutator and the two switches $19^+ 19^-$ are shifted from the position shown in Fig. VII by the following means: 31 is a ring, which is guided to a concentric movement about the armature-axis. 32 is a rod by which said ring is shifted forward or backward in said guide. The said ring is so coupled by links 33 with the brush-holder and by rod 34 with the switches $19^+$ $19^-$ that a movement of rod 32 in one or other direction simultaneously lifts or depresses said brushes and shifts said switches in the manner indicated in the figure.

Figs. XVII, XVIII, and XIX represent a provision for discretionary connection of the individual field-magnet bobbins either in multiple, as in Fig. XVII (see diagram XX) or in series, as in Fig. XVIII. (See diagram XXI.)

My peculiar grid-form field-magnet core, although especially designed for and here illustrated and employed in a shunt-wound motor, is manifestly applicable to dynamo-electric machines generally.

The windings of my multiplex field-magnet may be of diverse grades of wire at different parts. Various arrangements of such diversity are possible.

Fig. XXX, which represents my preferred arrangement, has its external windings composed of a coarser grade of wire than that employed on the interior bobbins.

In the form of my multiplex field-magnet which has coreless differently-wound bobbins 50 interposed between the cored bobbins still another (preferably coarser) grade of wire may be employed in the coreless bobbins. (See Fig. XXXI.)

Fig. XXIX illustrates a utilization of the form of duplex commutator hereinbefore described for therapeutical purposes or for technical instruction, &c. In this figure Y represents such a commutator mounted on and insulated from a suitable shaft 5, which is journaled on a stand 1. The shaft has a winch or hand-wheel 55. Any current source or generator—such as a galvanic battery 56—communicates by supply-circuit 59 alternately with the long and the diametrically-coupled short segments as the winch is rotated. The patient or pupil by grasping the handles 58 completes the outer circuit 57 and receives the shock of an alternating current whose rapidity of pulsations, depending on the velocity of winch rotation, are under complete momentary control by the operator.

The above-described mode of carrying out my invention is obviously susceptible of various elaborations, modifications, or adaptations. For example:

(a) The bars of my grid-formed field-magnet core, instead of being swaged integrally to the head may consist of separately forged or stamped plates, which may be individually secured to the head 12 by the same bolts 3 which secure said head to the upright, or said separate plates may be electro-welded to both head and pole plate.

(b) One or more pairs of bobbins of my multiplex field-magnet winding may be of different grades of wire to that employed in the general winding.

(c) The brush arrangements may be such as to transmit the reverse current to the short antipodal segment either of the same or different plane of rotation.

(d) The general or exterior winding $a\ a$ may be omitted and the field-magnet winding may consist solely of the bobbins upon the series of core-plates.

(e) The cored field-bobbins (field-magnet bobbins proper) may be placed farther apart and their interstices be occupied by coreless bobbins upon non-magnetic centers or spools 50, said coreless bobbins being wound oppositely to the bobbins proper, (see Figs. XVII and XVIII,) so as to screen the windings of said bobbins proper from each other, and thereby lessen their adverse mutual induction, and so as by the inductive action of said coreless and oppositely-wound bobbins upon the cored bobbins to intensify the current action and consequent electro-magnetic efficiency of the latter.

(f) The supplementary commutator may be located at the same end of the armature as the normal commutator instead of being placed at the opposite end, as in the present illustration.

(g) The above specification explains how my duplex commutator, being interposed between the dynamo-circuit and the circuit which leads to the ordinary commutator, transmits the one-way current of such circuit in alternate form to said commutator. Conversely, by interposing such a duplex commutator between the ordinary commutator of a dynamo and the outer circuit thereof (see Figs. XXIII to XXVI, inclusive) the continuous current from the ordinary commutator may be transmitted in alternating form into line for electric lighting or other service requiring alternating current. (See Figs. XXVII, XXVIII, and XXIX.)

(h) Such duplex commutator rotated from any suitable source of motion 51 may be utilized as shown in Fig. XXVII, in which the one-way current from a storage-battery 52 or other current source is by passage through such duplex commutator employed to drive an electric motor 53 or to send an alternating current into line for an electric light 54 or other service. (See Fig. XXVIII.)

(i) Or such a commutator driven by a hand-wheel 55 may be employed to convert a one-way current from a voltaic battery 56 into an alternating ("faradic") current in wires 57, that terminate in customary electrodes 58 to be grasped by a subject of electro-therapeutic treatment. (See Fig. XXIX.) The device shown in Fig. XXIX can be at any instant converted into a transmitter of continuous current by simply bringing the commutator to a position of rest, at which the brushes on one side short-circuit through one and the same long segment, and therefore without reversing.

(*j*) In place of the metallic outer circuit a grounded circuit may be used where appropriate.

Having thus described my invention, the following is what I claim as new therein and desire to secure by Letters Patent:

1. A duplex commutator of electric currents, which consists of a series of long insulated segments alternated with pairs of short segments in two different planes and having diametric connection, in combination with two pairs of brushes for conversion of a continuous into an alternating current, and vice versa, substantially as set forth.

2. In a dynamo-electric machine, the combination, with a continuous-current commutator, of the optionally-included supplemental commutator Y, having two pairs of brushes of which one pair connects with the armature through the normal commutator and the other pair connects with the outer circuit, said supplemental commutator having long segments which communicate direct from a brush of the interior pair to one of the exterior pair, so as to transmit direct current, and interposed short segments which communicate in reverse diametrically through the commutator and transmit reverse currents.

3. An attachment for a dynamo-electric machine of shunt type, consisting of a supplemental commutator in which for each long segment there are two interposed short segments in two separate planes of rotation, all of said segments revolving with and being insulated from the armature-winding and (except as to the diametrically-paired short segments) from each other.

4. In a dynamo-electric machine having the field-magnet and armature in shunt of one another, the combination, with a normal commutator thereof, of a supplemental commutator whose segments connect with the armature-winding only through said normal commutator, the segments of said supplemental commutator consisting of long and intervening pairs of short segments arranged in two separate planes of rotation, all of said segments (except the diametrically-paired short ones) being insulated from one another.

5. The means whereby a continuous-current dynamo-electric machine can be converted at will into an alternate-current machine, and vice versa, said means consisting of the combination of the supplemental commutator whose electrical connection with the armature is wholly through the normal commutator, said supplemental commutator having arranged alternately upon it long segments and interposed couples of short diametrically-connected segments, two pairs of brushes in two separate planes, of which one pair connects with the line and the other pair is capable of connection with the brushes of the normal commutator, and means for cutting said alternate-current devices out of circuit and for simultaneous direct connection of the line-wires with the normal brushes, and vice versa, substantially as set forth.

6. The means for discretionary change of a normally-continuous dynamo-circuit to one transmitting alternate current, which consists of the combination, with the alternate or supplementary commutator composed of long segments 28 and of interposed diametrically-united short segments 29 29' in two planes, of the respectively interiorly and exteriorly communicating pairs of pivoted brushes $20^+$ $20^-$ $23^+$ $23^-$, a shifting ring 31, having link connection 33 with said brushes and with switches $19^+$ $19^-$, that connect with the brushes of the normal commutator, contact-plates $17^+$ $17^-$, that connect with the interiorly-communicating brushes $20^+$ $20^-$ of the said supplementary commutator, and contact-plates $18^+$ $18^-$, which connect the normal commutator direct with the dynamo-circuit, the whole being arranged and operating substantially as set forth.

7. The combination of metallic outer and motor circuits, the interposed duplex commutator or alternator, and a duplex switch by which such alternator is cut in or out of the said motor-circuit at will.

8. A polar limb or element Z of a dynamo-field, which consists of a grid-formed core, each of whose bars has a separate bobbin or winding, in the described combination with a general or enveloping winding.

9. In a dynamo-electric machine, a field-magnet having a series of cored bobbins, in combination with interposed oppositely-wound coreless bobbins, for the purpose set forth.

10. In a dynamo-electric machine, a field-magnet having a series of bobbins on iron cores parallel to the plane of the magnetic axis and the axis of armature rotation and in magnetic connection with pole plates and heads, in combination with interposed coreless and oppositely-wound bobbins, substantially as and for the purpose set forth.

11. In the field-magnet of a dynamo-electric machine, the combination, with a series of cored bobbins and interposed oppositely-wound coreless bobbins, of means for coupling such cored and coreless bobbins either in series or multiple, as set forth.

12. In a field-magnet of a dynamo-electric machine, the combination of two series of interior bobbins whose geometrical axes are all parallel to the magnetic axis—to wit, a series of cored and a series of interposed oppositely-wound coreless bobbins—a pole-plate and a head-plate in magnetic continuity with the bobbin-cores, an exterior bobbin or winding permanently in circuit, and means for cutting one or more pairs of said interior bobbins in or out of circuit.

13. In a field-magnet of a dynamo-electric machine, the combination of two series of interior bobbins arranged in pairs—namely, a series of cored bobbins and a series of oppositely-wound coreless bobbins—an encircling exterior bobbin permanently in circuit, and means for placing one or more pairs of said interior bobbins in circuit and in serial or multiple connection with such exterior bobbin.

14. A grid-formed field-magnet core which consists of parallel and detachable I-formed component plates or layers in planes parallel to the magnetic axis and to the axis of armature rotation.

15. A grid-formed field-magnet which consists of a bundle of separate I-formed plates constituting the cores proper and contiguous portions of the pole-plates, said I-formed plates being in planes parallel to the magnetic axis and to the axis of armature rotation and carrying the bobbins proper, in combination with interposed oppositely-wound coreless bobbins, the whole being inclosed by an exterior winding, substantially as set forth.

16. A multiple field-magnet having an external and an interior winding, the external winding being of coarser wire than the interior winding.

17. A multiplex field-magnet having cored bobbins and having interposed coreless bobbins differentially wound with wire of a coarser grade.

18. A faradic shocker in which, combined with an internal closed circuit 59 and an external normally-open circuit 57, having handles 58, both circuits having suitable collectors $20^+$ $20^-$ $23^+$ $23^-$, is the manually-rotatable duplex alternator Y, having long segments 28 and interposed diametrically-connected short segments 29 29' in different planes of rotation, substantially as set forth.

CHARLES W. THOMAS.

Witnesses:
HERBERT KNIGHT,
GEORGE S. BELL.